United States Patent Office 2,929,729
Patented Mar. 22, 1960

2,929,729

COMPOSITIONS AND METHODS USEFUL IN PREPARING CEMENT SLURRIES

Homer F. Waggoner, Duncan, Okla., assignor to Halliburton Oil Well Cementing Company, Duncan, Okla.

No Drawing. Application June 28, 1957
Serial No. 668,599

10 Claims. (Cl. 106—89)

This invention relates to compositions of matter and methods useful in preparing cement slurries of the type wherein hydraulic cement, such as Portland or pozzolanic cement or a mixture thereof, is used with an additive which controls or changes its normal characteristics or properties, such as by accelerating the setting or hardening thereof in the presence of water.

While the invention may be applied generally, it provides particular advantages when used in connection with certain oil well cementing and other operations wherein it is desirable to employ an aqueous cement slurry containing an accelerating additive.

For example, after cementing surface pipe or casing in an oil or gas well or the like, it is ordinarily desirable to proceed with further operations as quickly as possible, often within a few hours after placement of the cement slurry in the well. To this end it is desirable to include in the cement slurry an additive which will reduce the setting or hardening time and increase the early strength of the cement. Heretofore various additives have been proposed for this purpose but calcium chloride has probably been most widely used. As commonly employed, the calcium chloride is added in amounts equal to about 2% by weight based upon the weight of the dry cement.

Generally satisfactory results have been obtained using calcium chloride as an accelerating additive in aqueous cement slurries employed in the foregoing and certain other operations. However, it is recognized that improvements are needed. In particular, there is need for an accelerating additive which affords a greater reduction in what is known as "Waiting-on-Cement" time. That is, there is need for an accelerating additive which causes the cement to set or harden more rapidly, particularly during the early stages of the setting or hardening period, so that the compressive strength of the cement becomes sufficient to allow further operations to be performed and the well to be placed on production within a shorter period of time after placement of the cement slurry.

In this connection it should be noted that it is also desirable for the cement slurry to remain pumpable, using conventional pumping equipment, for a sufficent period of time after preparation thereof to permit accurate placement of the slurry in the well. It is primarily for this reason that the "flash-setting" type of accelerating additives are not suited for use in the foregoing and similar operations involving relatively extensive pumping of an aqueous cement slurry.

A general object of the present invention is to provide improved compositions of matter and an improved method useful in preparing cement slurries.

Another object of the invention is to provide an improved accelerator for hydraulic cement.

Another object of the invention is to provide improved compositions of matter for and an improved method of accelerating the setting or hardening of hydraulic cement, such as Portland or pozzolanic cement or a mixture thereof.

Another object of the invention is to provide an improved cement slurry for use in certain oil well cementing and other operations.

Another objects of the invention is to provide an improved aqueous cement slurry containing an improved accelerating additive which reduces the setting or hardening time and increases the early strength of the cement but permits relatively extensive pumping of the slurry after preparation thereof.

A further and more specific object of the invention is to provide an improved aqueous cement slurry for use in cementing surface pipe or casing in an oil or gas well or the like.

In accordance with the invention, the foregoing and other objects and additional advantages are attained by using an additive consisting essentially of ammonium chloride and one of the metal chlorides, such as calcium or sodium chloride.

In preparing a cement slurry containing the additive, it is believed that the order of mixing or combining the ingredients is not critical. Thus, the ammonium chloride and the metal chloride may be added separately or together and ordinarily at any convenient time prior to the final mixing or stirring of all the ingredients together.

In the case of an aqueous slurry, however, the accelerating effect of the additive may make it necessary or at least desirable not to mix the cement and water together until just prior to beginning the operation of pumping or otherwise placing the slurry at the desired location where the cement is to set or harden.

In one way of proceeding, a Portland cement and water slurry containing the accelerating additive herein disclosed may be prepared by first combining the cement and additive to provide a quantity of comminuted solids. Then the solids may be mixed with sufficient water to form a pumpable slurry.

Alternatively, the ingredients may all be mixed together at the same time. In any event, the ingredients should be intimately mixed, such as by stirring or otherwise agitating them sufficiently to adequately disperse the undissolved solids and provide a uniform slurry.

Where other additives or perhaps inert materials are to be included in the slurry, these may be added in the usual manner at any convenient time. If desired, one or both of the ammonium and metal chlorides may be mixed or combined with another additive or material prior to mixing all of the ingredients together.

Laboratory tests have been conducted in an attempt to compare certain characteristics and properties of aqueous cement slurries prepared in accordance with the invention with the same characteristics and properties of certain slurries not so prepared. In particular, it was desired to compare the suitability of the various slurries for use in cementing surface pipe or casing in an oil or gas well or the like. The results of these tests are shown in Table I.

Each of the slurry samples tested was prepared using the same formula except for the additive, which varied as shown in Table I. The cement was Ideal Portland, which is typical of those heretofore commonly used (with 2% calcium chloride as an accelerating additive) in cementing surface pipe or casing in wells. The water was tap water from the city mains and was included, in each sample, in the ratio of 46% by weight based on the weight of the dry cement.

In preparing the samples, the additive was first blended with the dry cement and then these solids were mixed with the water, using a Waring Blendor run at high speed for 35 seconds. In each instance where a percentage of additive ingredient is listed, the percentage is by weight based on the weight of the dry cement. Where no percentage is listed, that additive ingredient was not included.

Table I

| Sample No. | Additive, percent NaCl | CaCl₂ | NH₄Cl | Viscosity (Poises) Initial | 45 Min. | 6-Hr. Compressive Strength, p.s.i. | W.O.C. Time (Est.), hrs. |
|---|---|---|---|---|---|---|---|
| 1 | | | | 8 | 10 | 45 | 12-18 |
| 2 | 1 | | | 5 | 10 | 260 | 10 |
| 3 | 2 | | | 4 | 9 | 315 | 9 |
| 4 | 4 | | | 6 | 10 | 355 | 8 |
| 5 | 6 | | | 4 | 9 | 315 | 9 |
| 6 | | 1 | | 6 | 10 | 345 | 8 |
| 7 | | 2 | | 5 | 13 | 515 | 6 |
| 8 | | 3 | | 8 | 18 | 555 | 6 |
| 9 | | 4 | | 10 | 40 | (Viscous Gel Formed) | |
| 10 | | 5 | | 38 | 60 | (Viscous Gel Formed) | |
| 11 | | 6 | | 25 | 20 | 395 | 7 |
| 12 | | | 1 | 7 | 11 | 430 | 7 |
| 13 | | | 2 | 9 | 18 | 645 | 5 |
| 14 | | | 4 | 6 | 20 | 360 | 8 |
| 15 | | | 6 | 7 | 18 | 190 | 11 |
| 16 | 1 | 1 | | 7 | 10 | 380 | 7 |
| 17 | 2 | 2 | | 5 | 12 | 530 | 6 |
| 18 | 3 | 3 | | 7 | 30 | 410 | 7 |
| 19 | 0.5 | 0.5 | 0.5 | 4 | 10 | 360 | 9 |
| 20 | 1 | 1 | 1 | 3 | 11 | 455 | 7 |
| 21 | 1.5 | 1.5 | 1.5 | 4 | 15 | 540 | 6 |
| 22 | 1 | | 1 | 7 | 12 | 575 | 6 |
| 23 | 2 | | 2 | 9 | 15 | 705 | 5 |
| 24 | 3 | | 3 | 14 | 48 | 555 | 6 |
| 25 | | 1 | 1 | 7 | 13 | 705 | 5 |
| 26 | | 1 | 2 | 8 | 17 | 865 | 4 |
| 27 | | 1.5 | 1.5 | 8 | 19 | 835 | 4 |
| 28 | | 2 | 2 | 8 | 30 | 820 | 4 |
| 29 | | 2 | 1 | 9 | 21 | 745 | 5 |
| 30 | | 3 | 3 | 8 | 100+ | 830 | Unpumpable |

The viscosity tests were made using a Halliburton consistometer. Each slurry sample was subject to an initial viscosity test upon preparation thereof and then at intervals until its 45 minute viscosity was determined, the initial and 45 minute measurements being as shown in Table I. Then the sample was poured or placed into a mold where it was allowed to set or harden for a period of six hours and then its compressive strength was determined. Thus, the 6-hour compressive strength tests shown in Table I were made, in each instance, using the same slurry samples used in making the viscosity tests.

The actual measurements of viscosity and compressive strength were made in the laboratory using the equipment and generally the procedure of A.P.I. Code RP 10 B, "A.P.I. Recommended Practice for Testing Oil Well Cement," 5th Edition, May 1956. In the column of Table I designated "W.O.C. Time (Est.)," the figures shown are the estimated "Waiting on Cement" times, which are in the nature of predictions based upon experienced judgment as to the effect, in actual practice, of the measurements made in the laboratory. As applied to the cementing of surface pipe or casing in a well, the "Waiting on Cement" time is ordinarily the period during which the cement slurry upon being pumped into the well is allowed to set or harden therein before the well is considered ready for further operations.

Referring to Table I in detail, it will be noted that where no additive was included in the slurry, as in sample No. 1, the 6-hour compressive strength was only 45 p.s.i. and the estimated "Waiting on Cement" time was 12 to 18 hours.

Where the additive consisted of sodium chloride alone, as in samples No. 2 to No. 5, inclusive, the highest 6-hour compressive strength (355 p.s.i.) and the shortest estimated "Waiting on Cement" time (8 hours) were with respect to sample No. 4 which included 4% sodium chloride as the additive.

Where the additive consisted of calcium chloride alone, as in samples No. 6 to No. 11, inclusive, the highest 6-hour compressive strength (555 p.s.i.) and the next highest (515 p.s.i.) were obtained, respectively, with sample No. 8 which included 3% calcium chloride and with sample No. 7 which included 2% calcium chloride. In each of these two instances the estimated "Waiting on Cement" time was 6 hours.

No 6-hour compressive strength tests were attempted where the additive consisted of either 4% or 5% calcium chloride, as in samples No. 9 and No. 10, respectively. Each of these two samples formed into a viscous gel and thus the slurry was considered unsatisfactory. It is interesting to note, however, that a viscous gel did not form where 6% calcium chloride was added, as in sample No. 11.

Where the additive consisted of ammonium chloride alone, as in samples No. 12 to No. 15, inclusive, the highest 6-hour compressive strength (645 p.s.i.) and the shortest estimated "Waiting on Cement" time (5 hours) were with respect to sample No. 13 which included 2% ammonium chloride as the additive.

Where the additive consisted of sodium and calcium chlorides together, as in samples No. 16, No. 17 and No. 18, the highest 6-hour compressive strength (530 p.s.i.) and the shortest estimated "Waiting on Cement" time (6 hours) were with respect to sample No. 17 which included 2% sodium chloride and 2% calcium chloride.

Where the additive consisted of sodium, calcium and ammonium chlorides together, as in samples No. 19, No. 20 and No. 21, the highest 6-hour compressive strength (540 p.s.i.) and the shortest estimated "Waiting on Cement" time (6 hours) were with respect to sample No. 21 which included 1.5% of each of these three chlorides.

Where the additive consisted of sodium and ammonium chlorides together, as in samples No. 22, No. 23 and No. 24, the highest 6-hour compressive strength (705 p.s.i.) and the shortest estimated "Waiting on Cement" time (5 hours) were with respect to sample No. 23 which included 2% sodium chloride and 2% ammonium chloride.

Where the additive consisted of calcium and ammonium chlorides together, as in samples No. 25 to No. 30, inclusive, the highest 6-hour compressive strength (865 p.s.i.) was obtained with sample No. 26 which included 1% calcium chloride and 2% ammonium chloride as the additive. The second highest (835 p.s.i.) was obtained with sample No. 27 which included 1.5% calcium chloride and 1.5% ammonium chloride. In each of these instances and also where the additive consisted of 2% calcium chloride and 2% ammonium chloride, as in sample No. 28, the estimated "Waiting on Cement" time was only 4 hours.

No estimate of "Waiting on Cement" time was attempted for sample No. 30, which included 3% calcium chloride and 3% ammonium chloride as the additive, since the 45-minute viscosity measured 100+ poises, indicating that this slurry became unpumpable.

As hereinbefore indicated, the general practice heretofore has been to add 2% calcium chloride alone as an accelerating additive to aqueous cement slurries used in cementing surface pipe or casing in wells. This is the formula which was used in preparing slurry sample No. 7 of Table I. In testing sample No. 7, it was found that the 6-hour compressive strength was 515 p.s.i. and the "Waiting on Cement" time was estimated at 6 hours.

It will be noted that in each instance where the additive contained 1% or more ammonium chloride and 1% or more of either sodium or calcium chloride, as in samples No. 22 to No. 30, inclusive, the 6-hour compressive strength was higher than where 2% calcium chloride alone was added, as in sample No. 7, and also was at least as high as the highest obtained using calcium chloride alone, as in sample No. 8.

Upon the basis of the test results shown in Table I, it is believed that an accelerating additive containing from about 1% to about 2% ammonium chloride and from about 1% to about 2% of a metal chloride, such as sodium chloride, as in samples No. 22 and No. 23, or calcium chloride, as in samples No. 25 to No. 29, inclusive, will be satisfactory for general usage in aqueous cement slurries used in cementing surface pipe or casing in a well. However, experience may show that more or less than these recommended amounts will provide satisfactory results in particular operations.

The recommended amounts of ammonium and sodium chloride when used together are about 2% of each, as in sample No. 23. The recommended amounts of ammonium and calcium chloride when used together are from about 1.5% to about 2% ammonium chloride and from about 1% to about 2% calcium chloride, as in samples No. 26, No. 27 and No. 28.

It is understood, however, that for applications where pumpability of the slurry for an extensive period of time (for example, up to 45 minutes) is not a factor and in certain other situations, such as where the additive is used in a non-aqueous or oil-cement slurry, satisfactory results may be obtained using more than the above amounts of the additive ingredients. Also, it is understood that different brands or types of cement, as well as different batches of the same brand or type, sometimes have varying characteristics and properties, with the result that in particular instances more or less than the above amounts of additive ingredients may be used satisfactorily or may be needed for best results. Also, it may be necessary or desirable to take into account unusual conditions, such as excessive or subnormal temperatures, which may affect the characteristics and properties of the cement, where these are prevailing or are likely to occur in connection with the performance of particular operations.

Accordingly, it is understood that the invention is not limited to the particulars described herein but extends to cover equivalents and alternatives thereof coming within the scope of the appended claims.

What is claimed is:

1. In a cementing process utilizing hydraulic cement, the step of accelerating the setting or hardening of the cement by adding to a slurry of the cement an additive consisting essentially of ammonium chloride and one of the metal chlorides from the group consisting of sodium chloride and calcium chloride, the additive being included in the ratio of from about 1% to about 2% of ammonium chloride and from about 1% to about 2% of the metal chloride, the percentages being by weight based on the weight of the cement.

2. The invention as claimed in claim 1 wherein the metal chloride is sodium chloride and wherein the percentage of each of said ammonium and sodium chlorides is about 2.

3. The invention as claimed in claim 1 wherein the metal chloride is calcium chloride and wherein the percentage of ammonium chloride is from about 1.5 to about 2 and the percentage of calcium chloride is from about 1 to about 2.

4. A cement slurry consisting of an intimate mixture the essential ingredients of which are hydraulic cement, a liquid such as water or oil, and an accelerating additive consisting essentially of ammonium chloride and one of the metal chlorides from the group consisting of sodium chloride and calcium chloride, the additive being included in the ratio of from about 1% to about 2% of the ammonium chloride and from about 1% to about 2% of the metal chloride, the percentages being by weight based on the weight of the dry cement.

5. A cement slurry as claimed in claim 4 wherein the metal chloride is sodium chloride and wherein the percentage of each of said ammonium and sodium chlorides is about 2.

6. A cement slurry as claimed in claim 4 wherein the metal chloride is calcium chloride and wherein the percentage of ammonium chloride is from about 1.5 to about 2 and the percentage of calcium chloride is from about 1 to about 2.

7. An aqueous cement slurry having a reduced setting or hardening time and a high early compressive strength consisting of an intimate mixture the essential ingredients of which are hydraulic cement, water, from about 1% to about 2% ammonium chloride, and from about 1% to about 2% of a metal chloride from the group consisting of sodium chloride and calcium chloride, the percentages being by weight based on the weight of the dry cement.

8. An aqueous cement slurry as claimed in claim 7 wherein the metal chloride is sodium chloride.

9. An aqueous cement slurry as claimed in claim 7 wherein the metal chloride is calcium chloride.

10. In a process for cement surface pipe or casing in a well, the step of accelerating the setting or hardening of the cement by adding to the cement from about 1% to about 2% ammonium chloride and from about 1% to about 2% of a metal chloride selected from the group consisting of sodium and calcium chlorides, the chlorides being added by weight based on the weight of the dry cement.

References Cited in the file of this patent

UNITED STATES PATENTS

| | | |
|---|---|---|
| 1,365,077 | Ashenhurst | Jan. 11, 1921 |
| 1,772,999 | Huber | Aug. 12, 1930 |
| 1,951,186 | De Bow et al. | Mar. 13, 1934 |

OTHER REFERENCES

Lea et al.: The Chemistry of Cement and Concrete, Revised Edition, 1956, pp. 252–253.